United States Patent
Juhasz et al.

(10) Patent No.: US 9,057,798 B2
(45) Date of Patent: Jun. 16, 2015

(54) ADJUSTABLE SENSOR STREAMER STRETCH SECTION FOR NOISE CONTROL FOR GEOPHYSICAL SENSOR STREAMERS

(75) Inventors: Andras Robert Juhasz, Stockholm (SE); Gustav Göran Mattias Südow, Solna (SE); Rune Johan Magnus Mattsson, Trångsund (SE); Ulf Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 782 days.

(21) Appl. No.: 13/290,315

(22) Filed: Nov. 7, 2011

(65) Prior Publication Data
US 2013/0114374 A1    May 9, 2013

(51) Int. Cl.
G01V 1/38 (2006.01)
G01V 1/20 (2006.01)

(52) U.S. Cl.
CPC .......... G01V 1/201 (2013.01); *G01V 2001/204* (2013.01); *G01V 2210/1423* (2013.01); *G01V 2001/205* (2013.01)

(58) Field of Classification Search
CPC ............ G01V 1/201; G01V 2001/201; G01V 2001/204
USPC .................................. 367/20, 154
See application file for complete search history.

(56) References Cited

U.S. PATENT DOCUMENTS

| | | | |
|---|---|---|---|
| 4,617,518 A | 10/1986 | Srnka | |
| 4,660,183 A * | 4/1987 | McGowan et al. | 367/15 |
| 5,062,085 A * | 10/1991 | Andrews, Jr. | 367/20 |
| 7,031,223 B2 | 4/2006 | Kinkead | |
| 7,184,366 B1 | 2/2007 | Harrick et al. | |
| 7,298,672 B1 | 11/2007 | Tenghamn et al. | |
| 7,453,763 B2 * | 11/2008 | Johnstad | 367/20 |
| 7,460,434 B2 | 12/2008 | Stenzel et al. | |
| 7,518,948 B2 | 4/2009 | Stenzel et al. | |
| 7,545,703 B2 | 6/2009 | Lunde et al. | |
| 7,548,486 B2 | 6/2009 | Tenghamn | |
| 7,671,598 B2 | 3/2010 | Ronaess et al. | |
| 7,733,740 B2 | 6/2010 | Hillesund et al. | |
| 7,834,632 B2 | 11/2010 | Tenghamn et al. | |
| 7,835,225 B2 | 11/2010 | Söllner et al. | |

(Continued)

FOREIGN PATENT DOCUMENTS

| | | |
|---|---|---|
| EP | 0771429 B1 | 10/2001 |
| EP | 2339381 A2 | 6/2011 |

OTHER PUBLICATIONS

Peter Krylstedt, et al, "Numerical Modelling of Eleotromagnetic Frequency Sounding in Marine Environments: A Comparison of Local Optimisation Techniques," Marine Electromagnetic Conference (MARELEC) Conference Proceedings, Jun. 2001, Stockholm, Sweden.

(Continued)

*Primary Examiner* — Ian J Lobo

(57) ABSTRACT

A sensor streamer stretch section includes at least one spring. A means for coupling the spring at each end to at least one of a sensor streamer and a lead in cable is included. A cable is coupled at its ends to the means for coupling. The cable is capable of carrying at least one of electrical and optical signals. The cable is formed such that the cable undergoes substantially no axial strain when the shock cord is elongated. An adjustable damper is coupled between the means for coupling at each end of the stretch section.

20 Claims, 4 Drawing Sheets

(56) References Cited

U.S. PATENT DOCUMENTS 7,881,159 B2 2/2011 Hegna et al.
2009/0140741 A1 6/2009 Tenghamn et al.

OTHER PUBLICATIONS

Peter Krylstedt, et al, "A Sequential Approach to Inverse Modelling in Marine Electromagnetics: Recovering the Conductivity Profile from Measurements of the Electromagnetic Field," Marine Electromagnetic Conference (MARELEC) Conference Proceedings, Jun. 2001, Stockholm, Sweden.

Johan Mattsson, et al., "Error Analysis and Capability Modelling for Towed Streamer Electromagnetics," First Break, Aug. 2012, pp. 91-96, vol. 30.

Johan Mattsson, et al., "Towed Streamer EM: The Challenges of Sensitivity and Anisotropy" First Break, Jun. 2013, pp. 155-159, vol. 31.

Chris Anderson, et al., "An Integrated Approach to Marine Electromagnetic Surveying Using a Towed Streamer and Source" First Break, May 2010, pp. 71-75, vol. 28.

Technical Guide Kevlar Aramid Fiber, pp. 1-32, Sep. 2005.

Extending Spring Technology, Power Spring, pp. 1-6, Nov. 2000.

\* cited by examiner

ADJUSTABLE SENSOR STREAMER STRETCH SECTION FOR NOISE CONTROL FOR GEOPHYSICAL SENSOR STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The invention relates generally to the field of marine geophysical survey systems. More particularly, the invention relates to "stretch sections" used in sensor streamers in marine geophysical survey systems to reduce towing noise.

Marine geophysical survey apparatus known in the art include arrays of sensors, such as electromagnetic and/or seismic sensors disposed in structures adapted to be towed by a survey vessel through a body of water, such as a lake or the ocean. Such structures are known as "streamers" or "sensor streamers."

Streamers are essentially long cables, typically made up of a plurality of segments of about 75 to 150 meters length each. A streamer may include 100 or more such segments coupled end to end to form the complete streamer. Seismic and/or electromagnetic sensors may be disposed along the length of the streamer at spaced apart locations, typically within a receptacle formed in a buoyancy device. Electrical and/or optical cables may extend along the length of the streamer and may be coupled to the sensors so as to transmit signals generated by the sensors. The signals are communicated over the cable(s) to a recording device, which may be on the survey vessel or at another location such as onboard another vessel. Each streamer segment typically includes a combination mechanical and electrical/optical coupling at each of its axial ends so that the streamer segment can be coupled to another such streamer segment or to a "lead in" cable coupled to the survey vessel. The coupling transfers axial force from segment to segment and ultimately to the survey vessel through the lead in cable. Each coupling may be direct, or may be made through a "stretch section."

In a typical marine geophysical survey system, one or more streamers made as described above may be towed behind the survey vessel in the water. In survey systems having more than one streamer, the streamers are typically laterally separated from each other by coupling their forward ends at spaced apart positions to a "spreader cable" that extends transversely to the direction of motion of the survey vessel.

A particular issue that concerns marine geophysical survey systems known in the art is noise created by movement of the water past the lead in cable and the spreader cable, and due to acceleration imparted to the streamers as a result of currents in the water and other factors related to friction between the streamer(s) and the water. One device known in the art for reducing transmission of such noise between the lead in cable and the streamer is known as a "stretch section." For example, stretch sections are described in U.S. Pat. No. 7,184,366 issued to Harrick et al., which is herein incorporated by reference. Stretch sections known in the art are effective in reducing vibratory noise in a range of frequencies, e.g., 20 Hz and above, that are detected by seismic sensors when such are the type of sensors used in the streamers. Such stretch sections have devices, e.g., shock cords, to enable a degree of isolation of acceleration between the components connected by the stretch section. Shock cords may be self damping, however separate damping devices may also be used in stretch sections known in the art.

Marine electromagnetic sensor streamers typically include electromagnetic sensors, such as spaced apart electrode pairs, wire loops or coils, and/or magnetometers to detect naturally occurring electromagnetic fields (magnetotelluric fields) or electromagnetic field components resulting from imparting electromagnetic fields in the body of water and in the formations below the water bottom. Motion induced vibratory noise in such cases may occur in frequency ranges below 10 Hz (e.g., on the order of a vessel swell frequency of around 0.1 Hz). Such noise may impact the electromagnetic field measurement channels and/or measurements of in-streamer motion (often determined with accelerometers).

It is desirable to have a stretch section which can be used in connection with marine electromagnetic sensor streamers as well as with seismic sensor streamers. It is also desirable to have stretch sections with adjustable spring constant and/or damping coefficient to optimize the noise reduction provided by the stretch section, depending on the type of streamer used and on the various conditions in the body of water at the time a geophysical survey is conducted.

DETAILED DESCRIPTION

Figure 1:
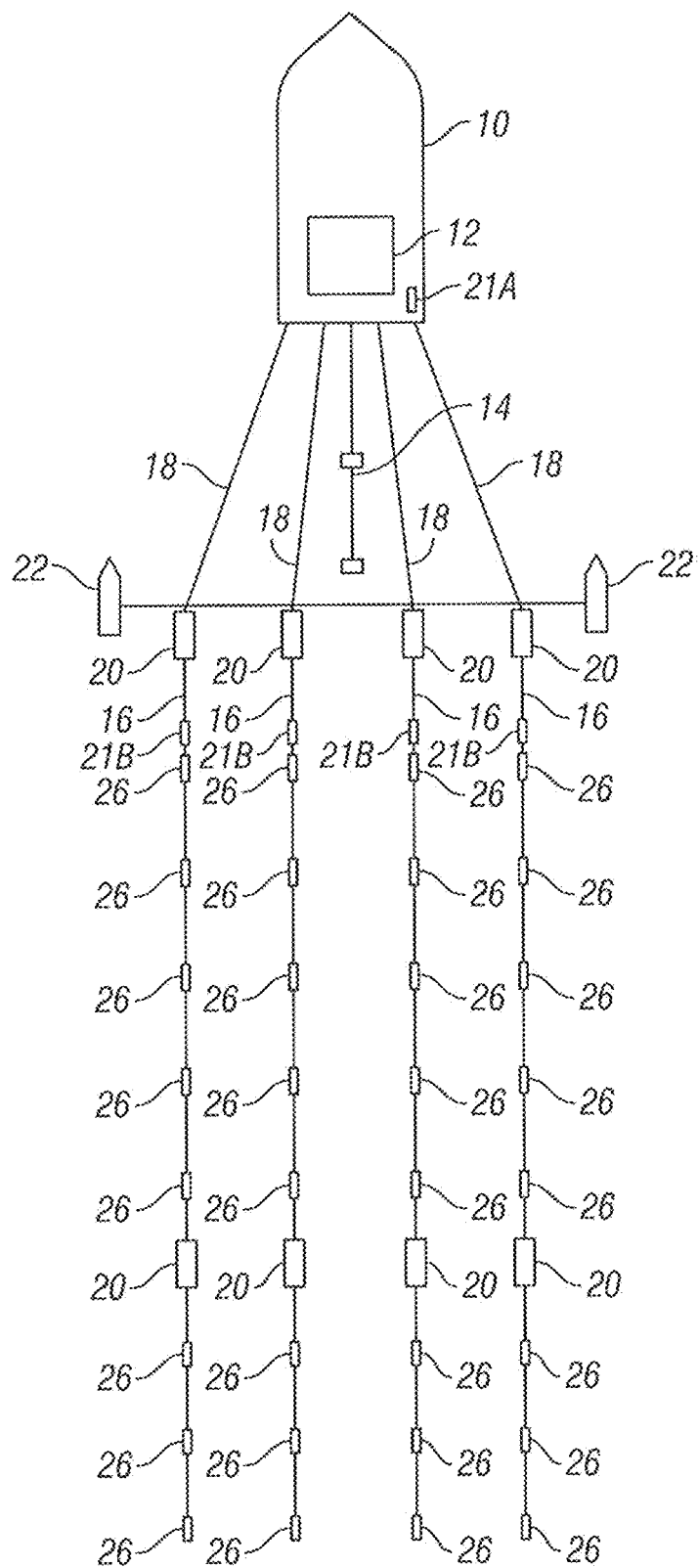
FIG. 1 schematically shows an example marine geophysical survey system in which example embodiments of stretch sections according to the invention can be used.

A marine geophysical survey system including example embodiments of "stretch sections" is shown schematically in FIG. 1. The marine geophysical survey system may include a survey vessel 10 which tows at least one, and typically a plurality of laterally spaced apart sensor streamers 16 through a body of water 11 such as a lake or ocean. The survey vessel 10 typically includes instrumentation thereon collectively called a "recording system" and shown generally at 12. The recording system 12 may include (none of which are shown separately for clarity of the illustration) navigation devices, electrical power supplies, data recording equipment and geophysical energy source actuation equipment of types well known in the art. The data recording equipment may make recordings, typically indexed with respect to time of actuation of a geophysical energy source 14 (e.g., a seismic energy source or array of such sources, and/or an electromagnetic transmitter), and of signals detected by sensors 26 disposed at spaced apart locations along the sensor streamers 16. The sensors 26 may be, for example, seismic sensors, electromagnetic sensors, or both.

The sensor streamers 16 may be made from a plurality of segments (not shown separately) each of which is about 75 to 150 meters length. A typical sensor streamer includes a plurality of such segments coupled end to end to form the complete sensor streamer 16. Each streamer segment (not shown separately) generally includes one or more steel or high strength fiber rope strength members (not shown separately) that extend the length of the streamer segment. A commonly used fiber is one sold under the trademark KEVLAR, which is a registered trademark of E.I. du Pont de Nemours & Co., Wilmington, Del. The one or more strength members (not shown separately) may have attached buoyancy devices (not shown separately) at spaced apart locations along the length of the strength members. The buoyancy devices (not shown) may be made from foamed polyurethane or the like and if included help provide the sensor streamer 16 with an overall density similar to that of the water in which the sensor streamer 16 is towed. Seismic and/or electromagnetic sensors 26 are disposed along the length of the sensor streamer 16 at spaced apart locations, sometimes in recesses in one or more of the buoyancy devices (not shown). Electrical and/or optical conductors (not shown separately) in a cable (not shown separately in FIG. 1) extend along the length of the sensor streamer 16 and may be in signal communication with the sensors 26 so as to transmit signals from the sensors 26 to the recording system 12. Such signals may be generated by the sensors 26 in response to energy emitted by the geophysical energy source 14 and subsequently modulated by interactions with formations below the body of water 11. The streamer segments may be partially or completely covered with an acoustically transparent, flexible jacket (not shown separately), such as made from polyurethane or the like. The interior of the jacket (not shown separately) is typically filled with an acoustically transparent, electrically non-conductive material such as oil, or curable urethane gel. The streamer segments typically include a combination mechanical and electrical/optical coupling (not shown separately) at each of their axial ends so that the streamer segments can each be coupled to another such streamer segment or to a "lead in" cable 18.

There is typically one lead in cable 18 for each of the sensor streamers 16 to couple each of the sensor streamers 16 mechanically, electrically and/or optically to the survey vessel 10. Mechanical coupling enables the survey vessel 10 to pull the sensor streamers 16 through the body of water 11. Electrical and/or optical coupling enables signals from the sensors 26 to be communicated to the recording system 12. Each lead in cable 18 may include electrical and/or optical conductors (not shown separately) surrounded by helically wound steel armor wires. The conductors in each lead in cable 18, if so provided, may carry the signals and/or carry electrical power. The armor wires transmit axial force from the survey vessel 10 for towing and to protect the conductors from damage.

In the example embodiment of marine geophysical survey system shown in FIG. 1, the sensor streamers 16 are towed at laterally spaced apart positions with respect to each other. Lateral separation may be maintained between the sensor streamers 16 by coupling the lead in end of each sensor streamer 16 to a spreader cable 24. The spreader cable 24 extends generally transversely to the direction of motion of the survey vessel 10, and may include a diverter 22 at each of its ends. The diverters 22 act cooperatively with motion of the water 11 as the marine geophysical survey system is towed through the water 11 such that tension is maintained on the spreader cable 24.

The embodiment of the marine geophysical survey system shown in FIG. 1 can include a geophysical energy source 14 of any type known in the art for marine geophysical data acquisition, and may include, without limitation, electromagnetic transmitters, seismic air guns, water guns or arrays thereof. FIG. 1 shows the geophysical energy source 14 being towed by the survey vessel 10. Other embodiments may include a plurality of such geophysical energy sources, or may have one or more geophysical energy sources towed by a different vessel (not shown).

All of the foregoing components of a marine geophysical survey system may be of types well known in the art. Particular specifications for any of the foregoing components of a marine geophysical survey system are a matter of discretion for the designer and user of such systems.

In the example embodiment of FIG. 1, each sensor streamer 16 may be coupled to its respective lead in cable 18 using a stretch section 20 configured as will be explained below with reference to FIGS. 2 through 6. The sensor streamers 16 may include one or more similar stretch sections 20 disposed at one or more intermediate positions along their length as shown in FIG. 1. The stretch sections 20 may provide an elastic coupling between the respective sensor streamers 16 and lead in cables 18, and, if used, between respective sections of the sensor streamers 16 such that vibratory noise caused by motion of the various components of the marine geophysical survey system in the water 11 can be attenuated. As would be understood by one of ordinary skill in the art with the benefit of this disclosure, the elastic coupling provided by stretch section 20 may be characterized by a spring constant (the ratio of applied force to longitudinal extension, usually expressed in kilograms or Newtons per meter) and a damping coefficient (the ratio of applied force to velocity, usually expressed in Newton seconds per meter). These characteristics, indicative of stretch section performance when used under specific conditions, are determined by the characteristics of the stretch section components.

Figure 2:
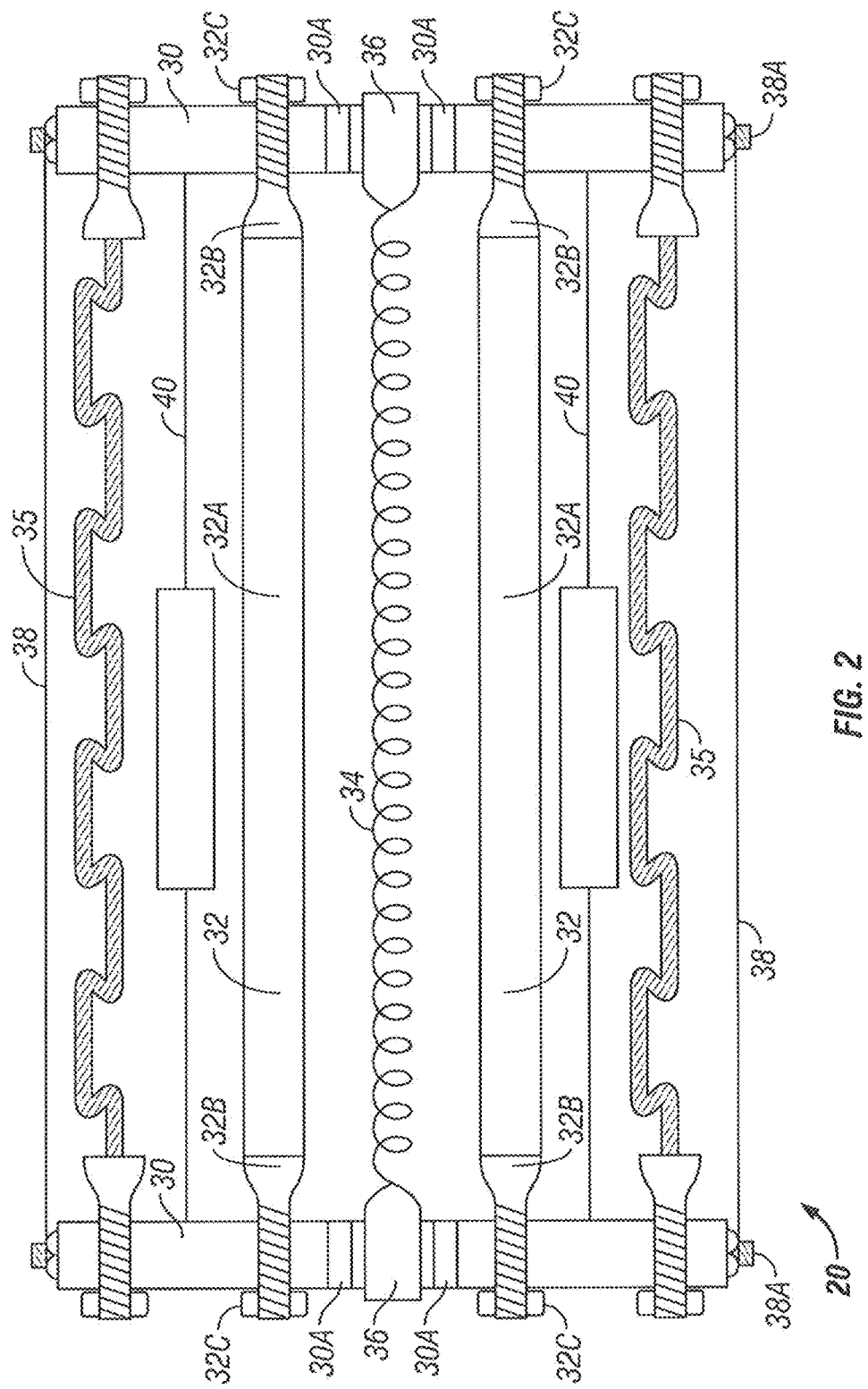
FIG. 2 schematically shows a cross sectional view of one example embodiment of a stretch section.

One example embodiment of a stretch section 20 is shown in cross-section in FIG. 2. The stretch section 20 may include at each longitudinal end a termination plate 30 that may be formed from steel, aluminum, fiber reinforced plastic, or other high-strength material. The termination plates 30 may be each joined to one end of one or more spring members 32. In one example embodiment the spring members 32 can be shock cords, the composition and configuration of which will be further explained. The spring members 32 may extend most of the length of the stretch section 20 and may be correspondingly coupled at each end thereof to one of the termination plates 30. In the present example embodiment, the spring members 32 may be shock cords made from a fiber-reinforced, elastomer cord material such as a material sold under product designation "PowerSpring" by Ibex Ropes, Ltd., Manchester Road, Mossley, Ashton-Under-Lyne OL5 9AJ, United Kingdom. Such shock cord material includes a rubber or other elastomeric tension element, which element is covered on its exterior by, and may be underlain inside its interior by, a woven fiber layer. The weave of the fiber layer(s) is such that it enables extension of the shock cord as tension is applied to the shock cord 32. In the present example embodiment, a nominal diameter of the shock cords (spring members 32) can be about 32 millimeters, and the unstretched length of the shock cords (spring members 32) can be selected to interact with other stretch section components to provide a selected spring constant and damping coefficient for the stretch section, thereby providing vibration damping for a sensor streamer in a frequency range appropriate for the type of streamer being used with the stretch section.

FIG. 2 also shows that the termination plates 30 each may include additional openings 30A through which additional spring members (e.g., shock cords) may be affixed to each termination plate 30. In the present example embodiment, if it is desirable to change the spring constant of the stretch section 20, the user may couple one or more additional spring members (e.g., shock cords) between the termination plates 30 to increase the spring constant, or may remove one or more spring members 32 to decrease the spring constant. Thus, the present example embodiment of the stretch section 20 may provide the capability to select a spring constant for the stretch section 20 that is appropriately matched to the amount of drag expected for the particular sensor streamer (16 in FIG. 1) and the frequency range of the noise that is desired to be attenuated. The amount of such drag will depend on, among other factors, the length and diameter of the sensor streamer (16 in FIG. 1), the speed at which the sensor streamer is towed through the water (11 in FIG. 1) and other conditions in the water that may affect acceleration imparted to the sensor streamers (16 in FIG. 1). In one example embodiment, the termination plates 30 are configured with openings 30A to enable coupling up to ten such spring members 32 therebetween. In the present example embodiment, the sensor streamers (16 in FIG. 1) may be electromagnetic sensor streamers. Such electromagnetic sensor streamers may include a plurality of electromagnetic sensors, e.g., as shown at 26 in FIG. 1, along the length thereof. Such electromagnetic sensors may include, without limitation, spaced apart electrode pairs, wire loops or coils and/or magnetometers.

In the present example embodiment, the spring members 32 (e.g., shock cords) may be coupled to the termination plates 30 by particularly formed end caps 32B. Each end cap 32B may be made from steel or other high strength material and can include at one an opening for receiving one end of the shock cord material 32A, and at the other end can include a threaded rod of suitable diameter and length to pass through one of the openings 30A in one of the termination plates 30. The threaded rod end of the cap 32B may be retained in the opening 30A by a hex nut 32C or similar threaded fastener. In the present example embodiment, the end caps 32B may be affixed to the shock cord material 32A by crimping the open end of the cap 32B over the cord material 32A and by including a bonding adhesive (not shown) such as epoxy in the interior thereof prior to crimping.

The stretch section 20 may also include an electrical and/or optical cable 34 of types known in the art for conducting data signals and/or electrical power. In the present example embodiment, the cable 34 may be wound in coil form as shown in FIG. 2, such that even at the full longitudinal extension of the stretch section 30, the electrical and/or optical cable 34 will substantially not undergo any longitudinal strain in the internal components thereof. The electrical and/or optical cable 34 may be coupled at each end to the termination plates 30 using an electrical and/or optical connector 36 of any type known in the art for joining seismic streamer segments to each other or to a lead in cable (18 in FIG. 1).

The stretch section 20 may include one or more a "catcher ropes" 35, coupled at each end to one of the termination plates 30. The catcher rope(s) 35 may be coiled, folded or otherwise include slack when the stretch section 20 is not subject to any axial loading. The extended length of catcher rope(s) 35 is selected to be less than the extended length of any of the electrical and/or optical cables 34. Likewise, the extended length of catcher rope(s) 35 is selected to be less than the length of the stretch section 20 when the maximum expected axial load is applied thereto. The purpose of the catcher rope(s) 35 is to prevent failure or loss of the sensor streamer (16 in FIG. 1) in the event the spring members 32 fail due to excessive stretch or other conditions. The catcher rope(s) 35 may in some embodiments be made from fiber rope similar in composition to that used for the strength member(s) in the sensor streamer(s).

The stretch section 20 may be covered by a waterproof, longitudinally elongatable jacket 38. The jacket 38 may be secured to the termination plates 30 by clamps 38A or the like, so as to substantially exclude water from the interior of the jacket 38. Preferably the jacket 38 is made from a material suitable for, and is of a configuration suitable to enable the jacket 38 to elongate to the expected length of the stretch section 30 under full axial load without damaging the jacket 38.

Referring back to FIG. 1, and as previously explained, in one example embodiment, the sensor streamers 16 may be electromagnetic sensor streamers, and the sensors may be any form of electromagnetic sensor. As more fully explained in U.S. Pat. No. 7,671,598 issued to Ronaess et al., motion of the sensor streamers 16 through the water 11 may result in voltages being induced in the electromagnetic sensors 26. By including one or more stretch sections 20 in each sensor streamer 16 (as explained above with reference to FIG. 2) and between the lead in cables 18 and the vessel end of each of the sensor streamer(s), acceleration imparted to the sensor streamers 16 during survey operations may be substantially reduced. In some embodiments, motion of the sensor streamers 16 may be determined by measuring voltages induced in the electromagnetic sensors. In some embodiments, motion of the sensor streamers 16 may be determined by including motion sensors on the survey vessel, shown at 21A in FIG. 1, and on each sensor streamer, shown at 21B in FIG. 1, aft (with respect to towing direction) of the first stretch section 20. Additional motion sensors may also be included aft of any stretch sections 20 disposed at intermediate positions along the sensor streamer, thereby providing more accurate location information for sensors 26 similarly disposed. Methods for attenuating motion induced noise in detected electromagnetic signals using induced voltages or using motion sensor measurements are more fully explained in the Ronaess et al. '598 patent, incorporated herein by reference.

Referring once again to FIG. 2, in some example embodiments of a stretch section 20, one or more adjustable damping devices 40 may be coupled between the termination plates 30. The example embodiment shown in FIG. 2 includes two such damping devices 40, however the number of such devices is not a limitation on the scope of the present invention.

Figure 3:
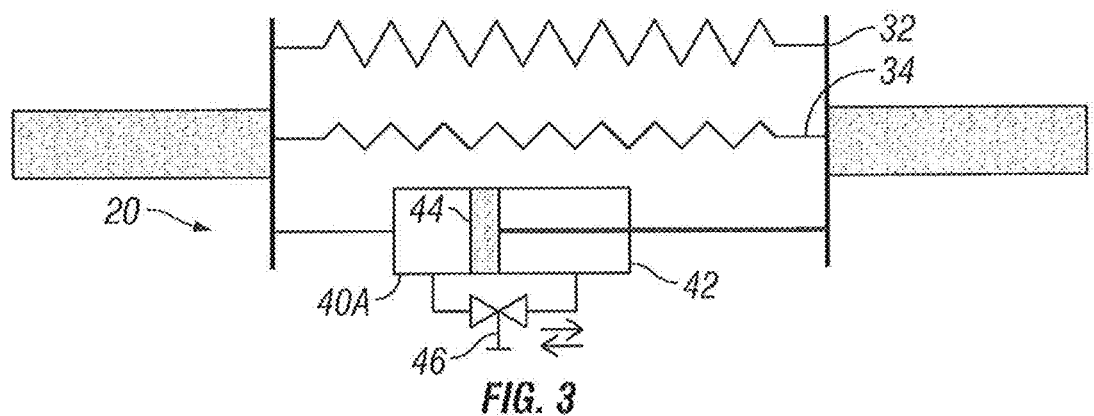
FIG. 3 schematically shows one example embodiment of an adjustable damping device in a stretch section.

Various, non-limiting examples of the adjustable damping devices 40 may be better understood with reference to FIGS. 3, 4, 5 and 6. In FIG. 3, the example embodiment of the adjustable damping device 40A may include an hydraulic cylinder 42 rigidly mechanically coupled to one of the termination plates (30 in FIG. 2). A piston and rod combination 44 may be rigidly coupled to the other of the termination plates (30 in FIG. 2). The hydraulic cylinder 42 may be filled with oil or similar fluid having a selected viscosity. The interior of the hydraulic cylinder 42 disposed on either side of the piston (and rod combination 44) may be hydraulically coupled together using an adjustable control valve 46. Such adjustable control valve 46 in the present example embodiment may be manually adjustable so that at the time the stretch' section(s) 20 are deployed with the associated sensor streamer (16 in FIG. 1), a selected amount of damping may be provided. In some example embodiments, the damping may be selected so that critical damping is provided at a selected frequency corresponding to the spring constant provided by the spring member(s) (shock cords) 32. For electromagnetic sensor streamers, for example, such critical damping may be provided in a range of about 0 to about 10 Hz. Other critical damping frequencies may be selected depending on the expected motion of the sensor streamers (16 in FIG. 1) in the water and on the types of sensors used on the sensor streamers (16 in FIG. 1).

Figure 4:
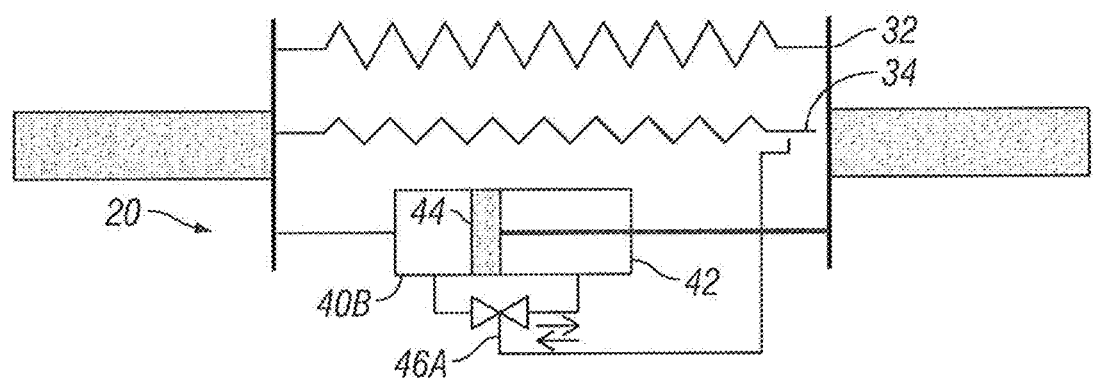
FIG. 4 schematically shows another example embodiment of an adjustable damping device in a stretch section.

Another example embodiment shown in FIG. 4 includes many of the same components for the adjustable damping devices as the example embodiment shown in FIG. 3. The example embodiment in FIG. 4, however, may include remotely adjustable control valve 46A connecting the interior of the hydraulic cylinder on either side of the piston. For example, remotely adjustable control valve 46A may be controlled by way of electrical, optical, acoustical, or hydraulic signals and devices. In some embodiments, electrical and/or optical connection of the remotely adjustable control valve 46A may be made through the electrical and/or optical cable (34 in FIG. 2) in the sensor streamer (16 in FIG. 1) to the recording system (12 in FIG. 1). In such example embodiment, the damping may be selectably controlled by the system operator on board the survey vessel (10 in FIG. 1), or may be dynamically controlled by the recording system (12 in FIG. 1) or by another computer (not shown) to obtain the most appropriate damping for the existing conditions in the body of water. The damping may thus be controlled as necessary during a survey, even along an individual survey "line" (motion of the survey system along a single, straight geodetic path). The remotely adjustable control valve 46A may also be fully closed if desired under certain conditions so that the stretch section 20 will be become substantially longitudinally rigid.

Figure 5:
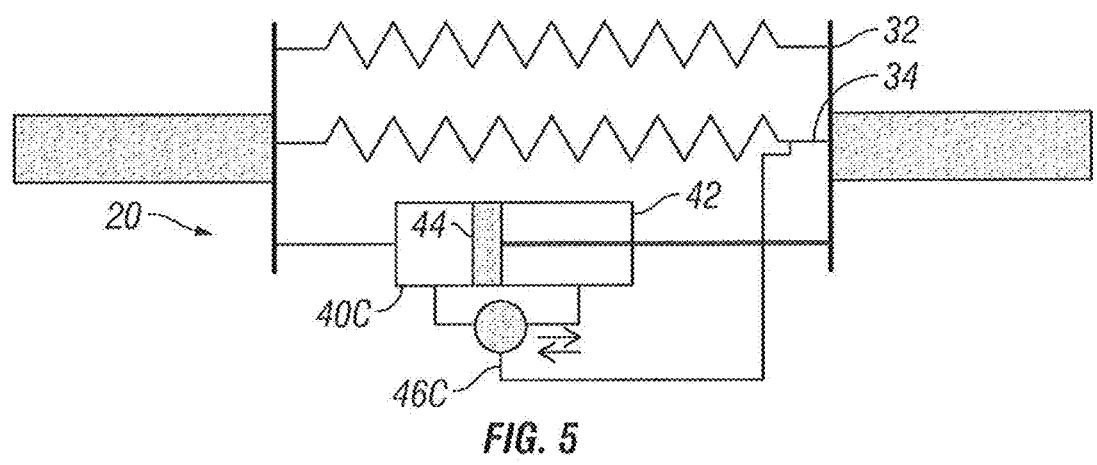
FIG. 5 schematically shows another example embodiment, of an adjustable damping device in a stretch section.

In another example embodiment, and referring to FIG. 5, is it possible to actively control the position of the piston 44 by substituting the manual or remotely adjustable control valves of FIGS. 3 and 4 with an hydraulic pump system 46C to obtain the least amount of motion coupling between the lead-in cable (18 in FIG. 1) and the forward end of the sensor streamer (16 in FIG. 1). Operation of the hydraulic pump system 46C may be performed by the recording system (12 in FIG. 1) or by another computer. It may also be possible using such example embodiment to obtain a substantially stable dynamic position of the forward end of the sensor streamer (16 in FIG. 1). Such dynamic position may be that which undergoes the least amount of acceleration (i.e., maintains the most constant velocity). In the present example embodiment, such result may be provided by using signals from the motion sensors (21A and 21B in FIG. 1) or electric induction measurements as control parameters to operate the hydraulic pump system 46C.

Figure 6:
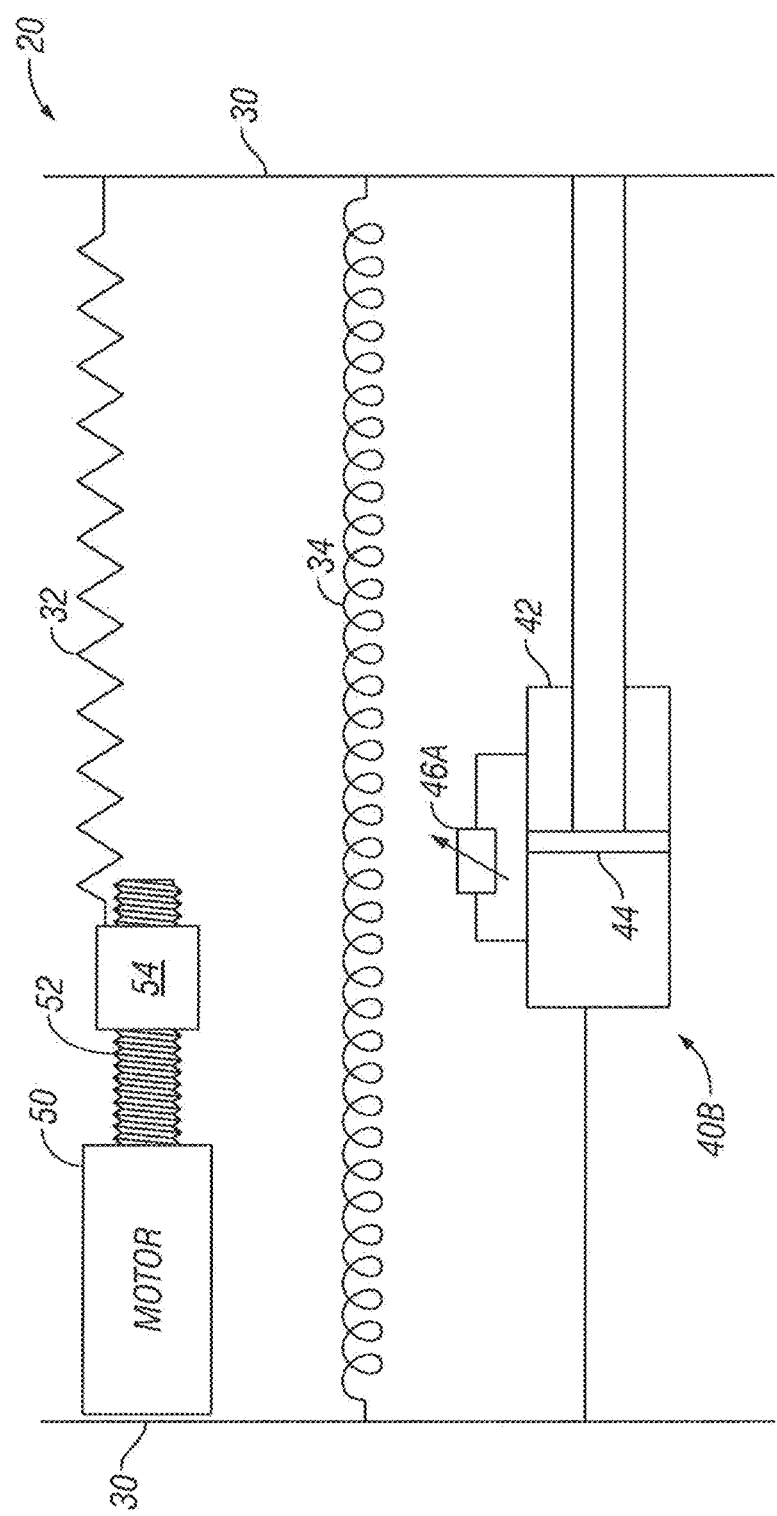
FIG. 6 schematically shows an example embodiment of a stretch section having adjustable spring constant and adjustable damping coefficient.

In another example embodiment shown in FIG. 6, both the spring constant and the damping coefficient of the stretch section 20 may be adjustable, for example, by manual or remote control from the recording system (12 in FIG. 1). The example embodiment shown in FIG. 6 is similar in structure to the example embodiment shown in FIG. 4, in that it may include an hydraulic cylinder 42 rigidly coupled to one of the termination plates 30 and a piston and rod combination 44 coupled to the other termination plate 30. A remotely adjustable control valve 46A may also be included to controllably adjust the amount of fluid pressure applied to the piston required to move it within the hydraulic cylinder 42, thus controllably adjusting the damping coefficient. The present example embodiment may also include a spring length controller (explained below) coupled to one of the termination plates 30 to change the length of the spring 32 when the stretch section 20 is fully relaxed. One example of such spring length controller may be a combination of a motor (e.g., and electric or hydraulic motor) 50, which rotates a worm gear, screw or similar threaded rod 52. A ball nut 54 may be placed on the threaded rod 52, whereby rotation of the motor 50 will result in change of the longitudinal position of the ball nut 54 on the threaded rod 54. One end of the spring member 32 may be coupled to the ball but 54 and the other end of the spring member 32 may be connected to the opposite termination plate 30 from the motor 50 such that changes in the longitudinal position of the ball nut 54 will result in corresponding change in length of the spring member. The motor 50 may thereby be operated to move the ball nut 54 away from the motor to reduce the spring force exerted by the spring member 32, or may, conversely, be operated to retract the ball nut 54 toward the motor to increase the spring force exerted by the spring member 32. If multiple spring members are used (e.g., as shown in FIG. 2), any number of or each such spring may include a similar spring length controller (e.g., a motor, threaded rod and ball nut) such as shown in FIG. 6. Thus, the spring constant and/or damping coefficient of the stretch section 20 in the example embodiment of FIG. 6 may be, without limitation, electrically or hydraulically adjustable. Other examples of spring length controllers may include, without limitation, hydraulic cylinder and piston combinations and cable spools.

In one example embodiment, stretch sections 20 such as shown in FIG. 6 may be used in the system shown in FIG. 1. During survey operations, a parameter related to noise may be measured. For example, induction noise may be estimated using the motion sensors (21A, 21B in FIG. 1). The spring constant and damping coefficient may be dynamically adjusted by suitable control of the motor 50 and remotely adjustable control valve 46A, respectively, to minimize motion induced noise in the sensor streamer(s) (16 in FIG. 1. It is also within the scope of the present invention to use electrical induction measurements as explained in the Ronaess et al. '598 patent to estimate the motion of the sensor streamers. In such example embodiments, the induction measurements may be used as a control signal to effect adjustment of the spring member length by operating the motor 50 and the remotely adjustable control valve 46A to minimize induction noise in the sensor streamer(s) (16 in FIG. 1).

Stretch sections according to the various aspects of the invention may provide optimized decoupling of survey vessel acceleration to sensor streamers, and may provide more stable motion of sensor streamers in a body of water than may be obtained with fixed spring constant, fixed damping stretch sections known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A sensor streamer stretch section comprising:
   a first termination plate on a first longitudinal end of the sensor streamer stretch section;
   a second termination plate on a second longitudinal end of the sensor streamer stretch section;
   an adjustable damping device coupled to each termination plate, and the adjustable damping device configured to provide a predetermined damping coefficient for the sensor streamer stretch section;
   at least one spring member, wherein:
   each spring member is coupled to each termination plate; and the number of spring members and a characteristics of each spring member configured to provide a predetermined spring constant for the sensor streamer stretch section.

2. The sensor streamer stretch section of claim 1 wherein one of the spring members comprises a shock cord.

3. The sensor streamer stretch section of claim 1 further comprising at least one cable selected from the group consisting of: an electrical cable, an optical cable, and any combination thereof, wherein the at least one cable is coupled to each termination plate.

4. The sensor streamer stretch section of claim 1 further comprising at least one catcher rope coupled to each termination plate.

5. The sensor streamer stretch section of claim 4 further comprising at least one cable selected from the group consisting of: an electrical cable, an optical cable, and any combination thereof, wherein the at least one cable is coupled to each termination plate, and wherein an extended length of the at least one catcher rope is less than an extended length of the at least one cable.

6. The sensor streamer stretch section of claim 1 further comprising a waterproof, longitudinally elongatable jacket secured to each termination plate.

7. The sensor streamer stretch section of claim 1 wherein:
the adjustable damping device is configured to provide the predetermined damping coefficient at a critical damping frequency; and
the critical damping frequency corresponds to the spring constant.

8. The sensor streamer stretch section of claim 1 wherein the adjustable damping device comprises a hydraulic cylinder and piston disposed therein, and wherein the hydraulic cylinder is hydraulically coupled across the piston by an adjustable control valve.

9. The sensor streamer stretch section of claim 8 wherein the adjustable control valve comprises a manually adjustable control valve.

10. The sensor streamer stretch section of claim 8 wherein the adjustable control valve comprises a remotely adjustable control valve.

11. The sensor streamer stretch section of claim 1 wherein the adjustable damping device comprises a hydraulic cylinder and a piston disposed therein and wherein the hydraulic cylinder is coupled across the piston using an hydraulic pump.

12. A sensor streamer stretch section comprising:
a first termination plate on a first longitudinal end of the sensor streamer stretch section;
a second termination plate on a second longitudinal end of the sensor streamer stretch section;
a spring member coupled to each termination plate, the spring member configured to provide a predetermined spring constant; and
a spring length controller coupled between an end of the spring member and one of the termination plates, wherein the spring length controller is configured to adjust the spring constant of the spring member.

13. The sensor streamer stretch section of claim 12 wherein the spring length controller comprises a motor, a threaded rod rotationally coupled to the motor, and a ball nut disposed on the threaded rod.

14. A marine geophysical survey system comprising:
a survey vessel;
a sensor streamer;
a lead in cable coupled at one end to the survey vessel and at the other end to the sensor streamer; and
a sensor streamer stretch section disposed at a location selected from the group consisting of: between the lead in cable and the sensor streamer, and an intermediate position along the sensor streamer;
the sensor streamer stretch section comprises:
a first termination plate on a first longitudinal end of the sensor streamer stretch section;
a second termination plate on a second longitudinal end of the sensor streamer stretch section;
a damping device couple to each termination plate, the damping device configured to provide damping of forces between the first and second termination plates;
a spring member coupled to each termination plate; and
a spring length controller coupled between the spring member and the first termination plate, the spring length controller configured to adjust the spring constant of the spring member.

15. The marine geophysical survey system of claim 14 further comprising one or more motion sensors, each motion sensor disposed at a location selected from the group consisting of: on the survey vessel, on the sensor streamer aft of one of the sensor streamer stretch sections.

16. The marine geophysical survey system of claim 14 further comprising a recording system on the survey vessel configured to at least one selected from the group consisting of: adjust the spring constant the at least one spring member; and adjust the damping coefficient of damping device.

17. The marine geophysical survey system of claim 14 wherein the sensor streamer comprises geophysical sensors at spaced apart locations thereon.

18. The marine geophysical survey system of claim 17 wherein the geophysical sensors comprise electromagnetic sensors.

19. A marine geophysical survey system comprising:
a survey vessel;
a sensor streamer;
a lead in cable coupled at one end to the survey vessel and at the other end to the sensor streamer; and
a sensor streamer stretch section disposed at a location selected from the group consisting of: between the lead in cable and the sensor streamer, and an intermediate position along the sensor streamer;
the sensor streamer stretch section comprises
a first termination plate on a first longitudinal end of the sensor streamer stretch section;
a second termination plate on a second longitudinal end of the sensor streamer stretch section;
a spring member coupled to each termination plate; and
a spring length controller coupled between an end of the spring member and the first termination plate, the spring length controller configured to adjust the spring constant of the spring member.

20. The marine geophysical survey system of claim 19 wherein the spring length controller further comprises a motor, a threaded rod rotationally coupled to the motor, and a ball nut disposed on the threaded rod.

* * * * *